(12) United States Patent
Skellenger (10) Patent No.: US 10,071,762 B2
(45) Date of Patent: Sep. 11, 2018

(54) DETECTION AND MITIGATION OF INVERTER ERRORS IN STEERING SYSTEM MOTORS

(71) Applicant: STEERING SOLUTIONS IP HOLDING CORPORATION, Saginaw, MI (US)

(72) Inventor: Dennis B. Skellenger, Saginaw, MI (US)

(73) Assignee: STEERING SOLUTIONS IP HOLDING CORPORATION, Saginaw, MI (US)

(*) Notice: Subject to any disclaimer, the term of this patent is extended or adjusted under 35 U.S.C. 154(b) by 100 days.

(21) Appl. No.: 15/364,707

(22) Filed: Nov. 30, 2016

(65) Prior Publication Data

US 2018/0148086 A1    May 31, 2018

(51) Int. Cl.
*H02P 25/22* (2006.01)
*B62D 5/04* (2006.01)
*H02P 6/08* (2016.01)
*H02P 6/12* (2006.01)

(52) U.S. Cl.
CPC .......... *B62D 5/0481* (2013.01); *B62D 5/046* (2013.01); *H02P 6/085* (2013.01); *H02P 6/12* (2013.01); *H02P 25/22* (2013.01)

(58) Field of Classification Search
CPC ............. H02P 25/22; H02P 6/085; H02P 6/12
USPC ................ 318/801, 800, 799, 798, 767, 727
See application file for complete search history.

(56) References Cited

U.S. PATENT DOCUMENTS 6,023,143 A * 2/2000 Salina ................... G11B 5/5547
318/254.2

* cited by examiner

*Primary Examiner* — David S Luo
(74) *Attorney, Agent, or Firm* — Cantor Colburn LLP (57) ABSTRACT

Technical solutions are described for detecting an error in an inverter associated with a motor of a power steering system and operating the power steering system in response to the error. An example system includes a transistor pair that selectively provides power to a corresponding phase coil of the motor. The system further includes a detection module that detects a resistance error in the transistor pair by monitoring a voltage across a shunt resistor of the transistor pair in response to a gate drive command applied to the transistor pair. The system further includes a mitigation module that selects a mode of operation of the inverter based on the resistance error. The system also includes a motor control module that controls the inverter according to the mode of operation.

20 Claims, 8 Drawing Sheets

DETECTION AND MITIGATION OF INVERTER ERRORS IN STEERING SYSTEM MOTORS

BACKGROUND

The present application generally relates to the field of electric motor controls, and specifically to an automotive power steering control system.

Typically, automobiles today use power steering systems, such as electric power steering (EPS) systems. In an EPS system, a driver's effort to steer the automotive are assisted by powered systems driven electrically. For example, the EPS system provides a steering torque assist directly by an electric motor drive. The motor itself can include a three-phase permanent magnet synchronous motor, or any other motor. The motor is driven from power sources such as a vehicle battery through application of an inverter system. The drive is typically monitored and controlled by a processing unit with sensors to detect the operating conditions of the motor. The EPS drive assist is called into use based on driver demand. Specifically, as a driver applies a steering force in one direction, the EPS system supplies a further torque in the same direction. The EPS system provides damping for the road feel and rack/column effects for return and other features. In other words, the EPS system works in all four torque speed quadrants. However, in case of inverter failure, the torque from the EPS motor can generate steering torque as current conducts through shorted circuit elements and body diodes as the motor back EMF increases due to motor velocity, temporarily shorting the phases. For example, a driver could be turning left while the motor drive erroneously provides damping torque resulting in higher efforts, which is undesirable.

The motor may be operated by a current mode controller. For current mode control, the current flowing into motor terminals is measured and compared to a calculated reference current signal and are representative of desired current for the motor to affect desired operating conditions.

However, by using such conventional techniques relatively weaker shorts, which cannot be detected based on transistor drain to source voltage, go undetected. The weaker shorts in the semiconductor elements of the inverter circuit lead to current measurement errors and mutual coupling in the motor windings, which in turn may be reacted to in current mode control loop before detection can be accomplished and changed to feed forward torque control, thus causing the current feedback to be wrong. This will create effort above manual conditions, which is undesirable. Further, the above techniques fail to distinguish an open semiconductor from a shorted semiconductor. An open semiconductor also leads undesirable effects in the driver assistance provided by the EPS system but need to be separately diagnosed because an open semiconductor will not cause shoot through and the inverter may still be commanded normally.

Accordingly, it is desirable to detect inverter errors, and identify root cause of the errors more precisely than conventional techniques to improve the operation of the EPS systems.

SUMMARY

Described herein are one or more embodiments of a system for detecting an error in an inverter associated with a motor of a system and operating the system in response to the error. The motor control system includes a transistor pair that selectively provides power to a corresponding phase coil of the motor of the system. The transistor pair includes a high-side transistor and a low-side transistor connected in series, where the high-side transistor is connected to a power supply, and the low-side transistor is connected to a shunt resistor, which is associated with the transistor pair. The motor control system further includes a detection module that detects a resistance error in the transistor pair by monitoring a voltage across the shunt resistor in response to a gate drive command applied to the transistor pair. The motor control system further includes a mitigation module that selects a mode of operation of the inverter based on the resistance error, and a motor control module that controls the inverter according to the mode of operation.

Further, described herein, are one or more embodiments of a system for operating a multi-inverter configuration that commutates a motor in a power steering system. The system includes a detection module configured to detect a resistance error in a transistor pair that switches power provided to a corresponding phase coil of a motor of the power steering system. The detection module detects the resistance error by monitoring a voltage across a shunt resistor associated with the transistor pair. The system also includes a mitigation module that selects a mode of operation of each respective one or more inverters in the multi-inverter configuration in response to the resistance error being detected, and based on a type of the resistance error detected. The system further includes a motor control module that controls the one or more inverters according to the each mode of operation respectively selected.

Further yet, described herein, are one or more embodiments of a method for commutating a motor in a power steering system using one or more inverters. The method includes detecting, by a detection module, a resistance error in a transistor pair that switches power provided to a corresponding phase coil of a motor of the power steering system. The detection module detects the resistance error by monitoring a voltage across a shunt resistor associated with the transistor pair. The method further includes selecting, by a mitigation module, a mode of operation of each respective inverter from the one or more inverters in response to the resistance error being detected, and based on a type of the resistance error detected. The method further includes controlling, by a motor control module, each inverter from the one or more inverters according to the respective mode of operation selected.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned. Further, for purposes of understanding, the term "signal" utilized herein is defined as any electrical signal or any stored or transmitted value. For example, a signal can comprise a voltage, or a current. Further yet, a signal can comprise any stored or transmitted value such as binary values, scalar values, or the like.

Figure 1:
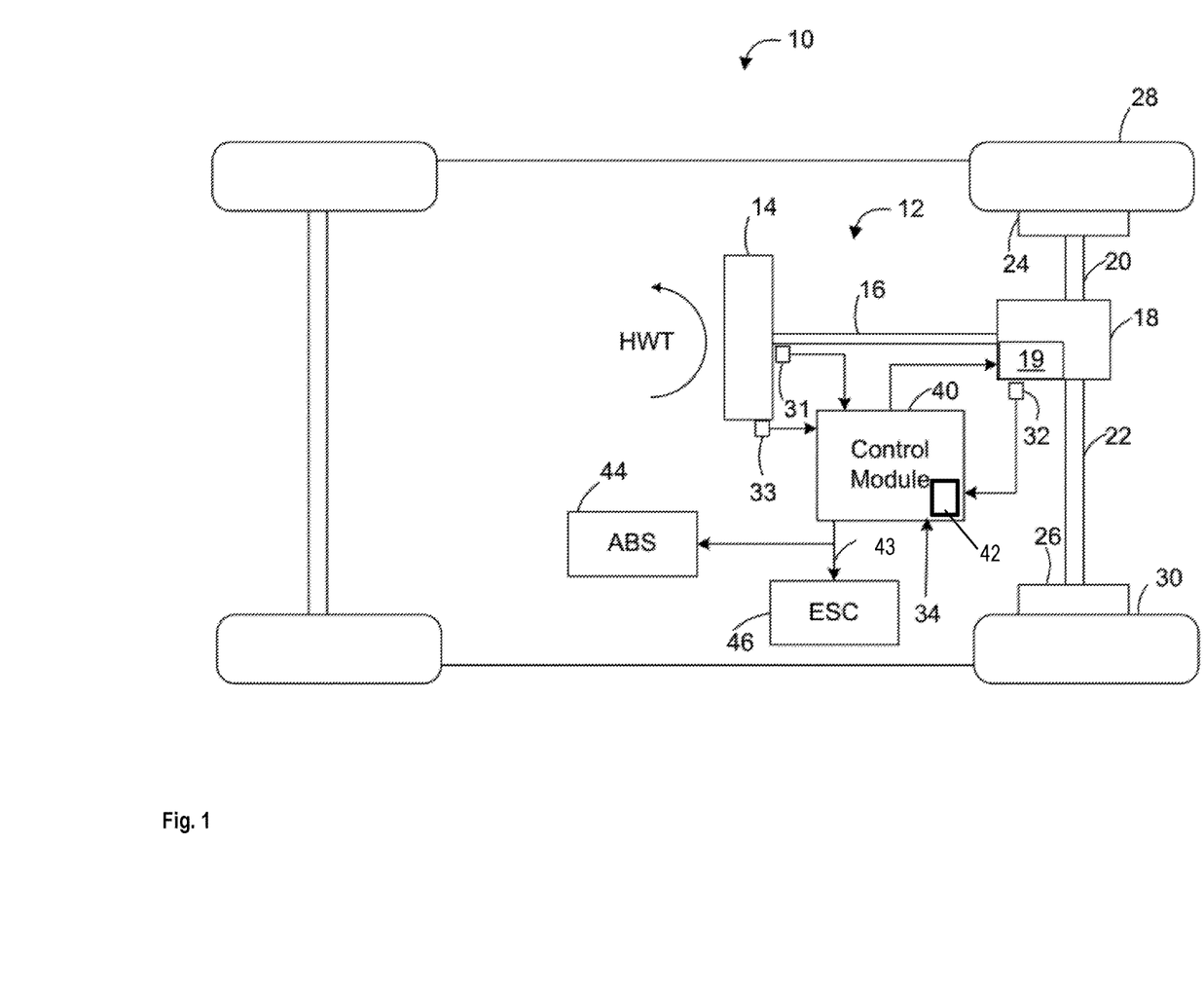
FIG. 1 is an exemplary embodiment of a vehicle including a steering system, according to one or more embodiments.

Referring now to the Figures, where the invention will be described with reference to specific embodiments, without limiting same, FIG. 1 is an exemplary embodiment of a vehicle 10 including a steering system 12. The steering system 12 is provided to steer the vehicle 10 in a desired direction.

In various embodiments, the steering system 12 includes a handwheel 14 coupled to a steering shaft system 16 which includes steering column, intermediate shaft, & the necessary joints. In one exemplary embodiment, the steering system 12 is an EPS system that further includes a steering assist unit 18 that couples to the steering shaft system 16 of the steering system 12, and to tie rods 20, 22 of the vehicle 10. Alternatively, steering assist unit 18 may be coupling the upper portion of the steering shaft system 16 with the lower portion of that system. The steering assist unit 18 includes, for example, a rack and pinion steering mechanism (not shown) that may be coupled through the steering shaft system 16 to a steering actuator motor 19 and gearing. The actuator motor 19 may be a permanent magnet synchronous motor, such as a three-phase permanent magnet synchronous motor. During operation, as a vehicle operator turns the handwheel 14, the steering actuator motor 19 provides the assistance to move the tie rods 20, 22 that in turn moves steering knuckles 24, 26, respectively, coupled to roadway wheels 28, 30, respectively of the vehicle 10.

As shown in FIG. 1, the vehicle 10 further includes various sensors 31, 32, 33 that detect and measure observable conditions of the steering system 12 and/or of the vehicle 10. The sensors 31, 32, 33 generate sensor signals based on the observable conditions. In one example, the sensor 31 is a torque sensor that senses an input driver handwheel torque (HWT) applied to the handwheel 14 by the operator of the vehicle 10. The torque sensor generates a driver torque signal based thereon. In another example, the sensor 32 is a motor angle and speed sensor that senses a rotational angle as well as a rotational speed of the steering actuator motor 19. In yet another example, the sensor 32 is a handwheel position sensor that senses a position of the handwheel 14. The sensor 33 generates a handwheel position signal based thereon.

A control module 40 receives the one or more sensor signals input from sensors 31, 32, 33, and may receive other inputs, such as a vehicle speed signal 34. The control module 40 generates a command signal to control the steering actuator motor 19 of the steering system 12 based on one or more of the inputs and further based on the steering control systems and methods of the present disclosure. The steering control systems and methods of the present disclosure apply signal conditioning and perform friction classification to determine a surface friction level 43 as a control signal that can be used to control aspects of the steering system 12 through the steering assist unit 18. The surface friction level can also be sent as an alert to an ABS 44 and/or ESC system 46 indicating a change in surface friction, which may be further classified as an on-center slip (i.e., at lower handwheel angle) or an off-center slip (i.e., at higher handwheel angle) as further described herein. Communication with the ABS 44, ESC system 46, and other systems (not depicted), can be performed using, for example, a controller area network (CAN) bus or other vehicle network known in the art to exchange signals such as the vehicle speed signal 34.

In one or more embodiments, the control module 40 includes a motor control system 42 that controls operation of the motor 19 in order to assist a vehicle operator in steering the vehicle 10. While the invention is described relative to a power steering system, it will be appreciated that the invention may be applicable to other motor control systems where detecting an error in an inverter associated with a motor would be found useful. The motor control system 42 may include, along with the handwheel torque sensor, the position sensor, a motor control circuit, such as a processor, memory, one or more inverters, and other electronic circuit components.

Figure 2:
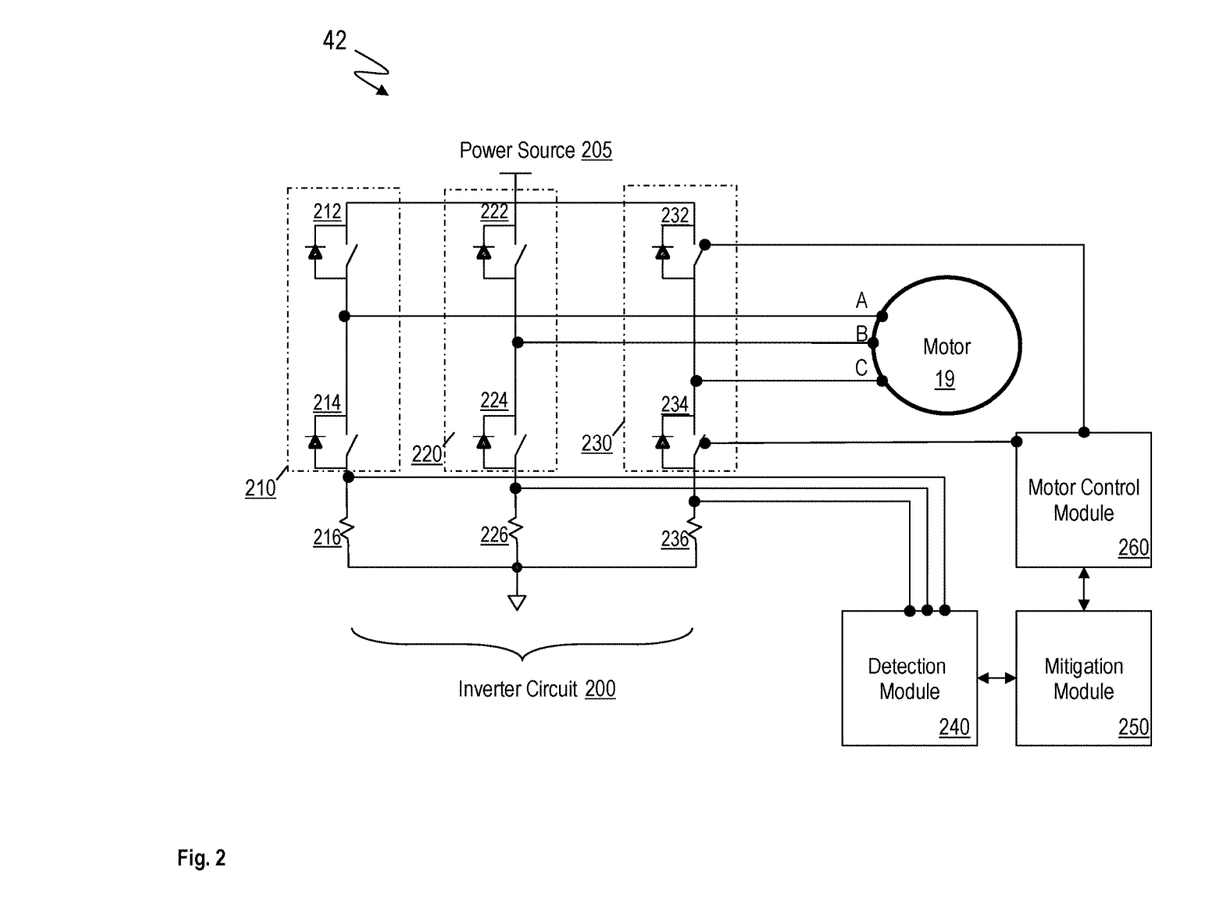
FIG. 2 illustrates an example block diagram of a motor control system a single inverter configuration according to one or more embodiments.

FIG. 2 illustrates an example block diagram of the motor control system 42 in a single inverter configuration. In the illustrated example, the motor control circuit 42 generates commutation pulses in an inverter circuit for controlling operation of a three-phase brushless electrical motor 19. The motor control circuit 42 includes a motor control module 260 that operates the inverter circuit 200 based on signals received from a mitigation module 250, and a detection module 240. In one or more examples, the inverter 200 has a 'Y-configuration' with phase coils connected to respective terminals A, B, and C of the motor 19. It is understood that in other examples, the motor 19 may have a different number of phases, and/or a different configuration.

The inverter circuit 200 includes one or more transistors switches. In one or more examples, the transistors are connected in pairs, such as a transistor pair 210, a transistor pair 220, and a transistor pair 230. Each transistor pair is connected to respective phase coils of the motor 19. It is understood that in other examples, the inverter circuit 200 includes a different number of transistor pairs, based on the number of phase coils of the motor 19. Each transistor pair includes a pair of transistors, such as field effect transistors (FET), a metal oxide FET (MOSFET), or any other insulated gate bipolar transistors (IGBTs). The examples described and illustrated herein use pairs of MOSFETs; however, it is understood that other semiconductor elements may be used in other implementations of the inverter circuit 200. In one or more examples, the transistors create sinusoidal output current using pulsed dc bus voltage, or pulse width modulation (PWM). The transistors may be actuated electronically to act as switches to power the motor 19. For example, by applying a positive voltage between gate and emitter points of the transistor, current is facilitated to flow from a collector point to an emitter point of the transistor. Thus, the transistors selectively couple a power source 205, such as a battery with the phase coils to energize and de-energize the coils.

In one or more examples, the motor control module 260 controls operational states of the transistors. For example, the motor control module 260 is coupled to gates of the transistors to provide gate drive commands to the transistors. By switching current in the phases of the inverter 200, the motor control module 260 generates the corresponding motion or torque from the motor 19. This is referred to as commutation. The commutation may be trapezoidal, modified six-step, sinusoidal, or any other type. In other words, commutation is the process of providing current into the inverter 200 to generate the desired motion or torque from the motor 19. Thus, the motor control module 260 controls the current in the inverter 200 to commutate the motor 19.

The inverter circuit 200 further includes a plurality of shunt resistors, each shunt resistor corresponding to a respective transistor pair in the inverter circuit 200. The shunt resistor may be connected to the corresponding transistor pair in series to facilitate monitoring current flowing through the corresponding semiconductor pair. For example, FIG. 1 illustrates shunt resistors 216, 226, and 236 corresponding to the transistor pairs 210, 220, and 230, respectively.

Each terminal of the motor 19 is coupled with a corresponding transistor pair. In one or more examples, each terminal of the motor 19 is connected at a drain and a source of a respective transistor pair. For example, as illustrated in FIG. 1, a terminal A is connected to a transistor pair 210, a terminal B is connected to a transistor pair 220, and a terminal C is connected to a transistor pair 230. Each transistor pair includes a high side transistor and a low side transistor. A node of the high side transistor is connected to the power source 205. Accordingly, FIG. 1 illustrates the high side transistors 212, 222, and 232 of the respective transistor pairs 210, 220, and 230, which are connected to the power source 205. A node of the low side transistor of each transistor pair is connected to the shunt resistor corresponding to the transistor pair. Accordingly, FIG. 1 illustrates the low side transistors 214, 224, and 234, of the respective transistor pairs 210, 220, and 230, connected to the shunt resistors 216, 226, and 236, respectively.

The detection module 240 detects inverter errors, which are errors in the inverter circuit 200 that cause undesirable effects in the driver-assist torque commands provided by the steering system 12. The mitigation module 250, in response to an inverter error detected by the detection module 240, determines a mode of operation for the motor 19. Accordingly, the motor control module 260 adjusts the commutation of the motor 19, for example by changing the input voltage and/or current supplied to the motor 19 via the inverter circuit 200. Additionally, or alternatively, the detection module 240 also senses the voltage across each transistor, such as for drain to source voltage detection, for detecting a short condition.

For example, the detection module 240 detects a resistance error in the one or more transistor pairs. The resistance error may include a short condition of a transistor, a weak-short condition of a transistor, and/or an open condition of a transistor in the inverter circuit 200. In a shorted transistor condition, if the motor control module 260 is operated without taking corrective steps, a shorted condition could exist across the power source 205. For example, in a shorted transistor condition, a majority of the current (several hundred amps) passes through the transistors, which leads to cascading a failure in a second transistor. Such cascading failure(s) may further result in a thermal event and eventual open fusing of the transistor or blowing of a battery fuse. From the EPS system standpoint, the shorted transistor condition results in a bridge with more braking torque, which effects can be reduced by detecting that first short and shutting down one or more of the transistors to prevent a cascaded short. The back EMF through the motor 19 has a path that shorts the phases when transistors are shorted. Further, if this is above the diode conduction of the internal body diodes, as the motor spins slowly there may not be an issue, however once the motor velocity reaches a predetermined threshold (for example, a 100 RPM, 200 RPM, or any other value) the diodes conduct and the phase is shorted to another phase, which creates dynamic braking. The detection and technical solutions herein reduce the effect of this braking torque resulting in more assist to the motor. The braking torque happens regardless of battery connection, as the braking torque is a function of the back EMF short and body diodes. If the battery is disconnected, or if the fuse blows, the braking torque still exists.

In one or more examples, the detection module 240 detects inverter errors in the inverter circuit 200 by measuring a voltage across each of the shunt resistors 216, 226, and 236. The detection module 240 detects a resistance error based on the shunt resistor voltage(s), as described herein. The mitigation module 250 determines a mode of operation to continue operation of the motor 19 depending on the resistance error provided by the detection module 240. Thus, the detection module 240, the mitigation module 250, and the motor control module 260, act as a control to regulate the current and/or voltage in the inverter circuit 200 in case of a resistance error(s).

The technical solutions described herein facilitate the detection module 240 to detect a weak-short condition of a transistor in the inverter circuit 200. A 'weak-short' or 'weak failure' of a transistor is a condition where the transistor is not in a high impedance state while in the OFF condition. For example, the weak-short of a transistor leads to a condition where the transistor is in an OFF state, yet provides a resistance of less than 1 Ω from drain to source but several time the resistance of RDSon associated with the transistor. It should be noted that while the technical features described herein are exemplified using a power steering system, the technical features may be implemented by a motor control system used that controls operation of a motor in any other electrical/electro-mechanical system.

Figure 3:
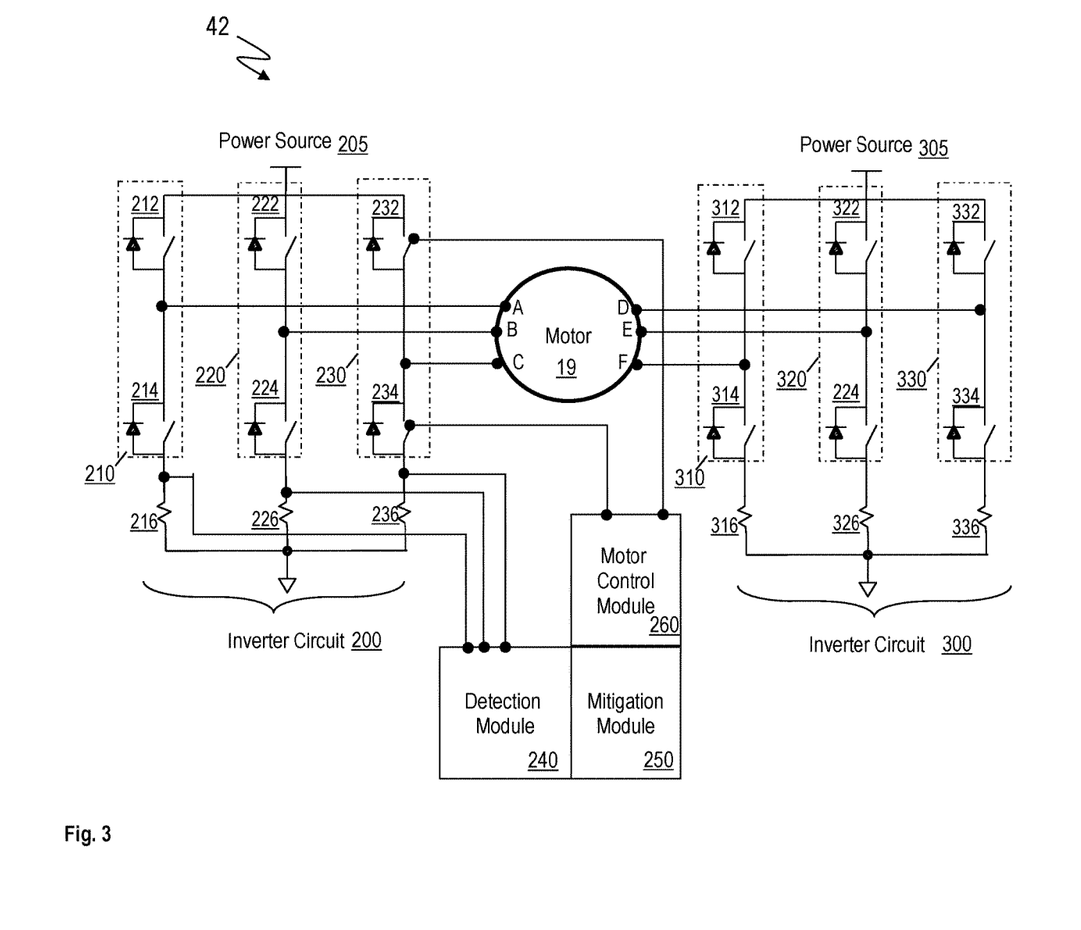
FIG. 3 illustrates an example block diagram of the motor control system a multi-inverter configuration according to one or more embodiments.

Thus, in the event of a weak-short failure of either transistor of the first transistor pair 210, for example, the resistance of either the high side transistor 212 or the low side transistor 214 changes from the high-impedance state to a low impedance state. Such a weak-short failure of a transistor from the transistor pair 210 may induce a weak shoot-through current through the transistor pair 210 that causes a voltage increase across the corresponding shunt resistor 216. The closed loop current control attempts to regulate the current in response, however causes further error. This current may couple through the mutual inductance to other windings in the inverter circuit 200 in case of a dual wound circuit, such as a dual-inverter configuration (FIG. 3). This is a technical problem that the technical solutions described herein address.

The embodiments described herein use one of the illustrated shunt resistors and transistor pairs as an example to describe the technical solutions. However, it is understood that any and/or all of the shunt resistors and MOSFET pairs may be used in other examples, unless specified otherwise.

For example, the detection module 240 monitors voltage measurements across the shunt resistor 216 to detect voltage increases caused by a change in transistor drain to source current. Because a weak-short error in a transistor causes a sudden shoot-through current, the detection module 240 can detect such an error condition in the transistor pair 210 by monitoring the voltage of the corresponding shunt resistor 216. In one or more embodiments, the detection module 240 may detect low and/or high side transistor shorts at values that exceed a typical RDS-On value of the respective high side transistor 212 or the low side transistor 214, based on the voltage measurements provided by the shunt resistor 216. The detection module 240 similarly monitors voltages across the other shunt resistors 226, and 236 to detect a weak-short condition in corresponding transistor pairs 220 and 230, respectively.

The detection module 240 further communicates with the motor controller 260 to localize a specific transistor in the transistor pair that has failed. For example, when the low side transistor 214 is in an OFF state (not powered), the current in the shunt resistor 216 may be approximately equal to zero. If the low side transistor 214 is shorted, the current is greater than zero (non-zero voltage) and detected by the detection module 240. Further, for detecting if the high side transistor 212 has shorted, the shunt current in the high side transistor 212 is measured when the low side transistor 214 is in an ON state (powered state). A shoot through current enabled by the high side transistor 212 that has shorted creates a considerably higher than reference current, which is detected by the detection module 240.

The detection module 240 includes multiple operational amplifiers (op-amp) to detect the weak-short condition. In one or more embodiments, each op-amp in the detection module 240 is connected to a respective shunt resistor from the inverter circuit 200. Thus, the detection module includes as many op-amps as the number of shunt resistors in the inverter circuit 200, and in turn as many transistor pairs in the inverter circuit. In one or more embodiments, the detection module 240 further includes a digital signal processing circuit that analyzes the output of each op-amp to determine the inverter error condition as described herein.

In one or more embodiments, the motor controller module 260 selectively controls each transistor of the transistor pairs 210, 220, and 230. For ease of illustration, only the transistor pair 210 is shown as being controlled by the motor control module 260. The detection module 240 communicates with the motor control module 260. In the event of a transistor weak-short, the motor controller module 260 turns off gates of the corresponding shorted transistor pair to localize and/or mitigate the failure. The technical solutions described herein, thus, improve the commutation, by decreasing the time to remove power from the weak-shorted transistor(s). The technical solutions described herein are applicable in case the steering system 12 uses multiple inverters, instead of the single inverter exampled illustrated in FIG. 2.

FIG. 3 illustrates an example motor control system 42 in which the motor 19 is powered using dual-inverters, which includes the inverter circuit 200, and a second inverter circuit 300. The motor 19, in this example, is a 6-phase or dual 3-phase set motor, with terminals A, B, and C, connected to the inverter circuit 200, and terminals D, E, and F, connected to the second inverter circuit 300. The dual-inverter (and other multiple-inverter) configuration face at least another technical problem of induced current. For example, a failure on terminal A due to a transistor short induces current in the terminal D. Similarly, a failure on terminal B induces current in terminal E, and a failure in terminal C induces a current in terminal F. The induced current in the second inverter 300 may produce a current that is regulated by the current feedback loop. If the transistor short resistance is higher than a conventional drain to source voltage shoot through detection can detect, the propagated error causes the torque command to be in error on the second inverter until the transistor failure produces heat in the transistor. This heat in the transistor causes a further failure until the resistance is low enough for the short to be detected. In other words, current regulation in the failed inverter is directly affected by the shorted MOSFET while the secondary inverter current regulation is also affected by induced currents in the second phase sets. This behavior in a dual inverter, dual phase system is undesirable, and the at least another technical problem that the technical solutions described herein address.

The detection module 240, the mitigation module 250, and the motor control module 260, as described herein, monitor and control the inverter circuit 200. In addition, the detection module 240, the mitigation module 250, and the motor control module 260, in a similar manner, monitor and control the second inverter circuit 300. Alternatively, a separate set of modules may be associated with the second inverter circuit 300. The modules for the inverter circuit 200 and for the inverter circuit 300 may include any number of microprocessors, digital signal processors or gate drive devices. For example, the modules include signal microprocessors with dual gate drivers/ inverters, dual microprocessors which are separate controllers that communicate with each other, or any other combination thereof. In one or more examples, a separate set of modules for the two inverter circuits 200 and 300 drives one phase set respectively. Alternatively, multiple controllers may operate phase sets of the same motor.

The second inverter 300 is similar to the inverter 200. In the illustrated example, the inverter circuit 300 also has three transistor pairs 310, 320, and 330, each corresponding to respective shunt resistors 316, 326, and 336. The transistor pairs 310, 320, and 330, each include corresponding high-side transistor 312, 322, and 332, respectively. The transistor pairs 310, 320, and 330, each include corresponding low-side transistor 314, 324, and 334, respectively. The detection module 240 detects the voltages across each of the shunt resistors in the second inverter circuit 300 in a similar manner to that described in case of the inverter circuit 200. The motor control module 260 controls the operation mode of the second inverter circuit 300 in response to the error conditions detected by the detection module 240, as described herein.

In one or more embodiments, which include dual-inverter configuration (or more inverters) such as illustrated in FIG. 3, the motor control module 260, in response to the detection of an error condition in one of the inverters, shuts down the failed inverter, and continues to use another inverter from the available inverters. For example, in case of FIG. 3, if the detection module 240 detects the weak-short, or open condition in the inverter circuit 200, the motor control module 260 shuts down the inverter circuit 200, and continues using the inverter circuit 300 to control the operation of the motor 19. Thus, the motor control module 260 deactivates the inverter with the failed transistor, and operates the motor 19 in a single inverter configuration in feed forward torque control by commutating using the inverter, which does not have the failure. In addition, the motor control module 260, using the mitigation module 250 and the detection module 240, identifies the root cause of the weak-short, or open condition in the failed inverter circuit 200.

In feed forward torque control mode the motor parameters are estimated and used with sensing to predict the voltage needed at the motor to achieve the proper torque, the advantage being that no current sensing errors affect the voltage predicted and sent to the motor phases. For example, in feed forward torque control mode, parameters such as temperatures and other sensor inputs to feed forward are used to predict what the motor parameters are and apply the correct voltage to achieve the assist torque. Thus, there is no feedback used to determine a PWM to apply and to achieve the correct voltage. In current mode, the phase currents are read by direct measurement and processed directly to control torque to the motor. Thus, current mode uses a voltage signal that is based on current to directly, or indirectly uses phase current feedback to regulate the torque in feedback control.

For example, when the high-side transistor 212 of the transistor pair 210 is commanded ON, and the low-side transistors 224, and 234, of the transistor pairs 220, and 230, respectively are commanded ON, an open-circuit failure of the lower transistor 224 of the transistor pair 220 results in a non-zero voltage across the shunt resistor 226. Accordingly, because of the discrepancy between measured voltages of the shunt resistors 226 and 236, the detection module 240 triggers an error condition. The motor control module 260 responds by deactivating the inverter 200, which is in error condition. Further, the motor control module 260 continues to operate the second inverter 300 after switching from current to feed forward torque control. It is understood that the error detection sequence described herein is applicable to either inverter, and any upper transistor and its respective lower transistors of the remaining phases. The inverter that includes the transistor in error condition may be referred to as a failed inverter.

In a feed forward torque control of operation, the motor control module 260 responds by removing power on the failed inverter 200 and allowing operation on the second inverter 300. Furthermore, the motor control module 260 may identify and change control methodologies to maintain a lower performance operation to help achieve some level of torque. Because the transistor is shorted, the "phase coil" is also shorted to power or ground. Thus, the applied power cannot be stopped. Accordingly, the technical solutions described herein facilitate a failure mitigation in such a case, by using information of the failed inverter to help determine a new commutation technique that will provide some level of torque. Thus, in response to the detection of the short or open transistor, the technical solutions facilitate the motor to commutate differently, accounting for the transistor that is shorted or open. Thus, the motor control module 260 may deactivate a specific phase coil of the inverter 200 (or 300). It is understood that the feed forward torque control of operation described herein is applicable to either inverter in a two-inverter system.

Figure 4:
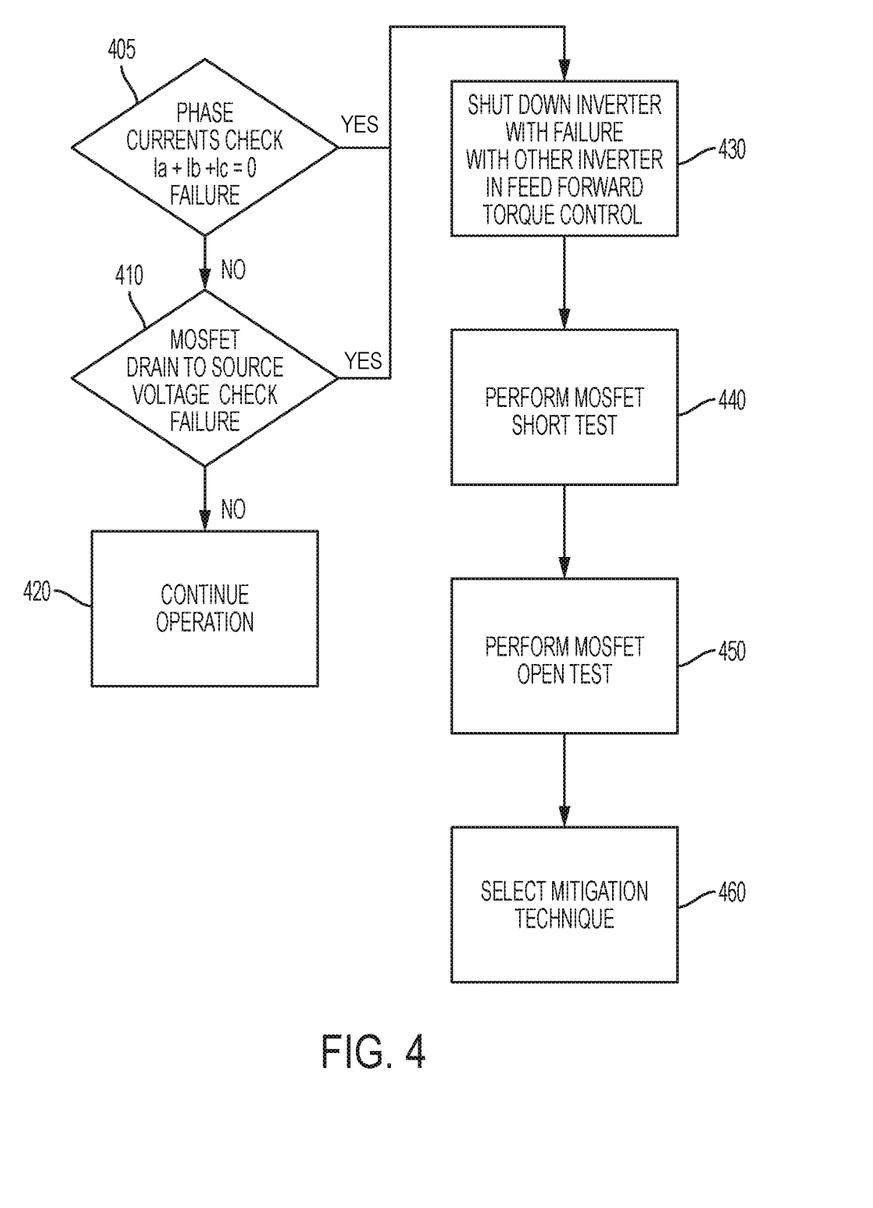
FIG. 4 illustrates a flowchart of an example method to diagnose a resistance error condition in an inverter according to one or more embodiments.

FIG. 4 illustrates a flowchart of an example method to diagnose a resistance error condition in an inverter that commutates a motor in the steering system 12 using the technical solutions described herein. The description herein uses checking the inverter circuit 200 as an illustration, however it is understood that in other examples and iterations, the method operates in a similar manner on other inverter circuits as well. The method includes checking that the sum of currents in the one or more phase coils of the inverter circuit complies with a predetermined condition, such as about 0 (zero), as shown at 405. For example, the method includes determining whether iA+iB+iC=0, where iA, iB, and iC represent values of current in the phase coils connected to the terminals A, B, and C respectively (FIG. 2).

In case the sum does not comply with the check, the detection module 240 deems that there is an inverter error condition, and proceeds to identify the root cause of the error condition as described further. Alternatively, in case the sum of the currents does comply, the method includes checking a drain-to-source voltage of each transistor in the inverter circuit 200, as shown at 410. If there is no voltage failure, the operation of the motor 19 continues, as shown at 420. Alternatively, if a voltage error is detected, the detection module 240 proceeds to determine the root cause according to the technical solutions herein as described further. For example, the voltage error is detected if the system has a hard short. In other words, a transistor with a low resistance short is triggered, and a mitigation mode in response is selected. In one or more examples, the current detection along may be used to detect both a weak-short and a hard-short. Alternatively, both, current and voltage detection may be used to detect the weak-short and the hard-short. Further, in one or more examples, if EPS system is already operating in feed forward torque control mode, the current diagnostic may not be used.

Thus, in response to an inverter current error condition and/or an inverter voltage error condition being detected, the detection module 240 identifies the root cause as described further. In one or more embodiments, the inverter 200 with the error condition is shut down, as shown at 430. Further, if another inverter 300 is available, such as in the dual-inverter configuration, the other inverter 300 is setup for the feed-forward torque control, to provide the driver torque assist, as shown at 430. Further yet, the combination of the detection module 240, the mitigation module 250, and the motor control module 260, performs a transistor short test to determine presence of a weak-short condition in the one or more transistors in the inverter 200, as shown at 440. Further, the combination performs a transistor open test to determine presence of an open condition in the one or more transistors in the inverter 200, as shown at 450. Based on the results of the short test and the open test, the mitigation module 250 performs one or more mitigation methods to commute the current, as shown at 460.

Figure 5:
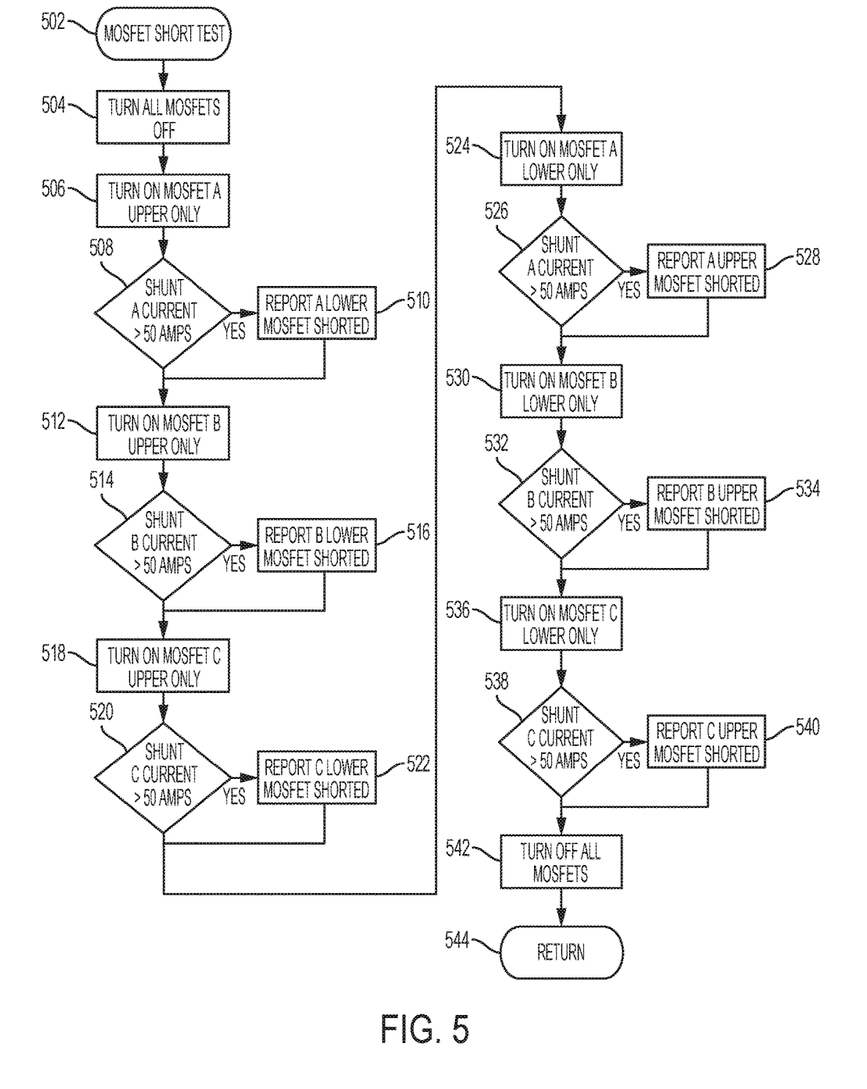
FIG. 5 illustrates a flowchart of an example method for performing a short-test to determine presence of a weak-short condition in one or more transistors in an inverter according to one or more embodiments.

FIG. 5 illustrates a flowchart of a method for performing the short-test to determine presence of a weak-short condition in the one or more transistors in an inverter. In one or more embodiments, the combination of the detection module 240, the mitigation module 250, and the motor control module 260, performs the transistor short test. Initially, the method includes shutting down all of the transistors in the inverter 200, as shown at 502. The method further includes switching each transistor in the inverter on according to a predetermined sequence and checking for a short condition, including a hard-short and/or a weak-short, for a transistor. In the example herein, the inverter circuit 200 with three phases and correspondingly three transistor pairs 210, 220, and 230 is used. However, it is understood that the transistor short test herein can be used in other inverters with different number of phases (transistor pairs) as well.

The method further includes turning on the high-side transistor 212 from the transistor pair 210, as shown at 506. The method further includes, checking, by the detection module 240, whether the current across the corresponding shunt resistance 216 is greater than a predetermined threshold, such as 50 AMPS, as shown at 508. If so, the method includes reporting the lower-side transistor 214 as being weak-shorted, as shown at 510. Thus, the low-side transistor 214 is identified as a possible root cause based on the current in the shunt resistance 216 when the high-side transistor 212 is ON.

The detection module 240 proceeds to check the other transistor pairs 220, and 230 in a similar manner Accordingly, the method includes turning on the high-side transistor 222 from the transistor pair 220, as shown at 512. The method further includes, checking, by the detection module 240, whether the current across the corresponding shunt resistance 226 is greater than a predetermined threshold, such as 50 AMPS, as shown at 514. If so, the method includes reporting the lower-side transistor 224 as being weak-shorted, as shown at 516.

The method further includes turning on the high-side transistor 232 from the transistor pair 230, as shown at 518. The method further includes, checking, by the detection module 240, whether the current across the corresponding shunt resistance 236 is greater than a predetermined threshold, such as 50 AMPS, as shown at 520. If so, the method includes reporting the lower-side transistor 234 as being weak-shorted, as shown at 522.

The method further proceeds to turn on the low-side transistors 214, 224, and 234 in the inverter 200. For example, the method includes turning on the low-side transistor 214 from the transistor pair 210, as shown at 524. The method further includes, checking, by the detection module 240, whether the current across the corresponding shunt resistance 216 is greater than a predetermined threshold, such as 50 AMPS, as shown at 526. If so, the method includes reporting the high-side transistor 212 as being weak-shorted, as shown at 528. Thus, the method facilitates detecting a weak-short in the high-side transistor by turning on the low-side transistor.

The method continues to check for weak-shorts in the high-side transistors in the other transistor pairs. For example, the method includes turning on the low-side transistor 224 from the transistor pair 220, as shown at 530. The method further includes, checking, by the detection module 240, whether the current across the corresponding shunt resistance 226 is greater than a predetermined threshold, such as 50 AMPS, as shown at 532. If so, the method includes reporting the high-side transistor 222 as being weak-shorted, as shown at 534. Further yet, the method includes turning on the low-side transistor 234 from the transistor pair 230, as shown at 536. The method further includes, checking, by the detection module 240, whether the current across the corresponding shunt resistance 236 is greater than a predetermined threshold, such as 50 AMPS, as shown at 538. If so, the method includes reporting the high-side transistor 232 as being weak-shorted, as shown at 540.

The method further includes turning OFF all the transistors in the inverter 200, which were turned ON during the method, as shown at 542. Accordingly, the technical solutions described herein facilitate determining a weak-short in the one or more transistor pairs and identifying the exact transistor that is in the error condition. It is noted that the sequence of checking the transistor pairs that is described herein is just an example, and that in other embodiments the transistor pairs may be checked in a different order.

Figure 6:
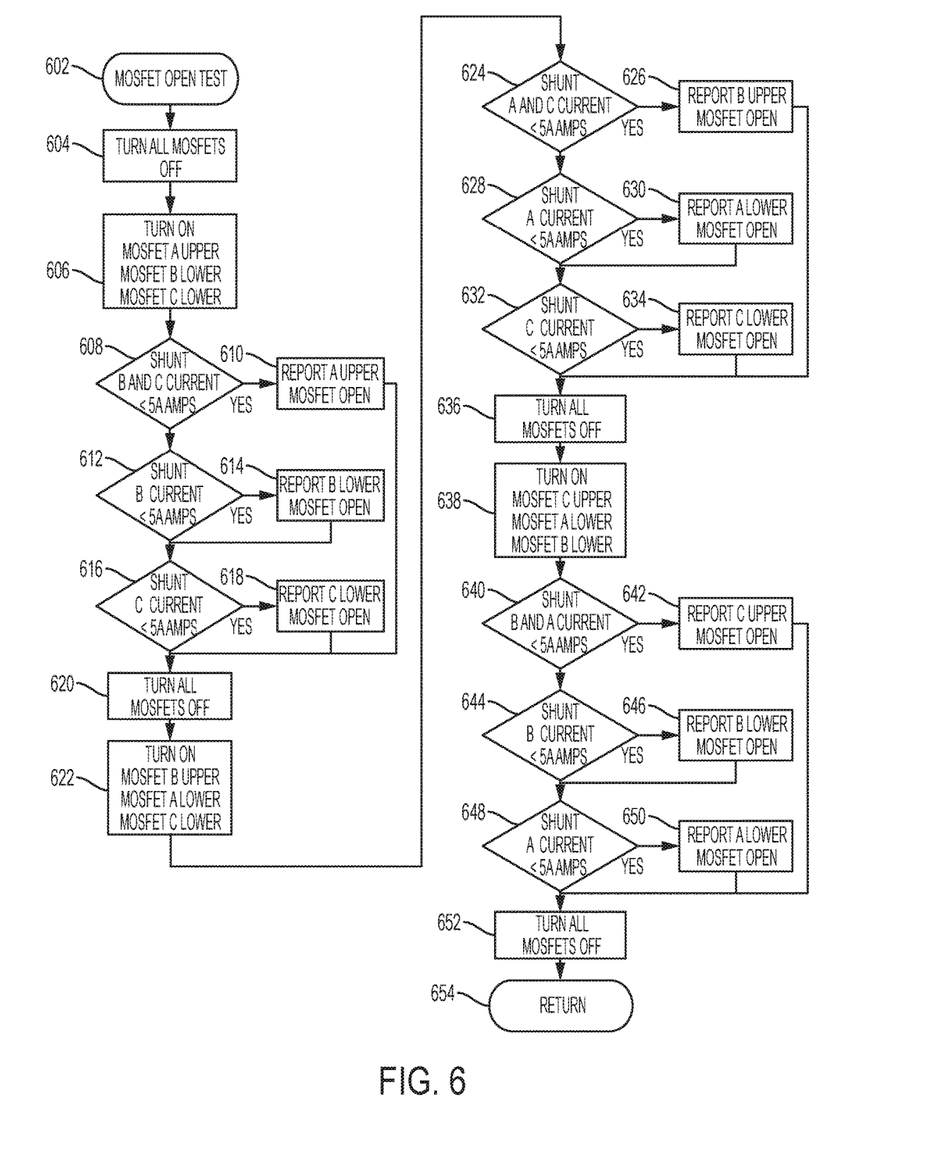
FIG. 6 illustrates a flowchart of an example method for detecting an open condition transistor in one or more pairs of transistors in an inverter according to one or more embodiments.

FIG. 6 illustrates a flowchart of an example method for detecting an open condition transistor in one or more pairs of transistors in an inverter. In one or more embodiments, the combination of the detection module 240, the mitigation module 250, and the motor control module 260, performs the transistor open test. Initially, upon starting all of the transistors in the inverter 200 are shut down, as shown at 602 and 604. The method further includes switching each transistor in the inverter on according to a predetermined sequence and checking for an open condition. In the example herein, the inverter circuit 200 with three phases and correspondingly three transistor pairs 210, 220, and 230 is used. However, it is understood that the transistor open test herein can be used in other inverters with different number of phases (transistor pairs) as well.

In one or more embodiments, the method includes turning on the high-side transistor 212, the low-side transistor 224, and the low-side transistor 234, as shown at 606. Thus, a high-side transistor from a first transistor pair, and low-side transistors from the second and third (other) transistor pairs are turned ON. The detection module 240 is then used for checking the respective current values across the shunt resistors corresponding to the second and third transistor pairs, in this case the shunt resistor 226, and the shunt resistor 236. If both the current values are below a predetermined threshold (such as substantially zero), the high-side transistor 212 from the first transistor pair 210 is reported as being open, as shown at 608 and 610. Thus, for example, the resistance error is identified as the open condition in the high-side transistor 212 upon detection of at least one of the second shunt resistor voltage (across shunt 226) and the third shunt resistor voltage (across shunt 236) being substantially equal to a zero voltage.

Alternatively, if only the current across the shunt resistance 226 corresponding to the second transistor pair 220 is below the predetermined threshold, the low-side transistor 224 of the second transistor pair 220 is reported as being in open condition, as shown at 612 and 614. Alternatively yet, if only the current across the shunt resistance 236 corresponding to the third transistor pair 230 is below the predetermined threshold, the low-side transistor 234 of the third transistor pair 230 is reported as being in open condition, as shown at 616 and 618. The method includes turning OFF all the transistors in the inverter 200, as shown at 620.

The method continues to facilitate testing the remaining transistors in the inverter 200. For example, the method includes turning ON the high-side transistor 222, the low-side transistor 214, and the low-side transistor 234, as shown at 622. Thus, a high-side transistor from the second transistor pair, and low-side transistors from the first and third (other) transistor pairs are turned ON. The detection module 240 is then used for checking the respective current values across the shunt resistors corresponding to the first and third transistor pairs, in this case the shunt resistor 216, and the shunt resistor 236. If both the current values are below a predetermined threshold, the high-side transistor 222 from the second transistor pair 220 is reported as being open, as shown at 624 and 626. Alternatively, if only the current across the shunt resistance 216 corresponding to the first transistor pair 210 is below the predetermined threshold, the low-side transistor 214 of the first transistor pair 210 is reported as being in open condition, as shown at 628 and 630. Alternatively yet, if only the current across the shunt resistance 236 corresponding to the third transistor pair 230 is below the predetermined threshold, the low-side transistor 234 of the third transistor pair 230 is reported as being in open condition, as shown at 632 and 634. The method includes turning OFF all the transistors in the inverter 200, as shown at 636.

The method continues to facilitate testing the remaining transistors in the inverter 200. For example, the method includes turning ON the high-side transistor 232, the low-side transistor 214, and the low-side transistor 224, as shown at 638. Thus, a high-side transistor from the third transistor pair 230, and low-side transistors from the first and second (other) transistor pairs 210, and 220, are turned ON. The detection module 240 is then used for checking the respective current values across the shunt resistors corresponding to the first and second transistor pairs, in this case the shunt resistor 216, and the shunt resistor 226. If both the current values are below a predetermined threshold, the high-side transistor 232 from the third transistor pair 230 is reported as being open, as shown at 640 and 642. Alternatively, if only the current across the shunt resistance 216 corresponding to the first transistor pair 210 is below the predetermined threshold, the low-side transistor 214 of the first transistor pair 210 is reported as being in open condition, as shown at 644 and 646. Alternatively yet, if only the current across the shunt resistance 226 corresponding to the second transistor pair 220 is below the predetermined threshold, the low-side transistor 224 of the second transistor pair 220 is reported as being in open condition, as shown at 648 and 650. The method includes turning OFF all the transistors in the inverter 200, as shown at 652. Once the open-condition transistor test is complete, the method includes returning to the mitigation selection operation, as described earlier (FIG. 4), as shown at 654.

Thus, using the transistor open-test, the exact transistor(s) failing due to an open condition is/are identified.

The detection module 240, upon identifying the root cause of the resistance error of a phase coil, generates and sends a resistance error identifier to the mitigation module 250. The resistance error identifier indicates a specific phase coil (or transistor pair), and a specific transistor in the phase coil that has the resistance error. The detection module 240, in addition, sends a resistance error-type identifier to the mitigation module 250. The resistance error-type identifier indicates the type of the resistance error, weak-short condition, open condition, short condition, and so on. The mitigation module 250 selects the appropriate mitigation technique based upon the resistance error identifier and the resistance error-type identifier.

Figure 7:
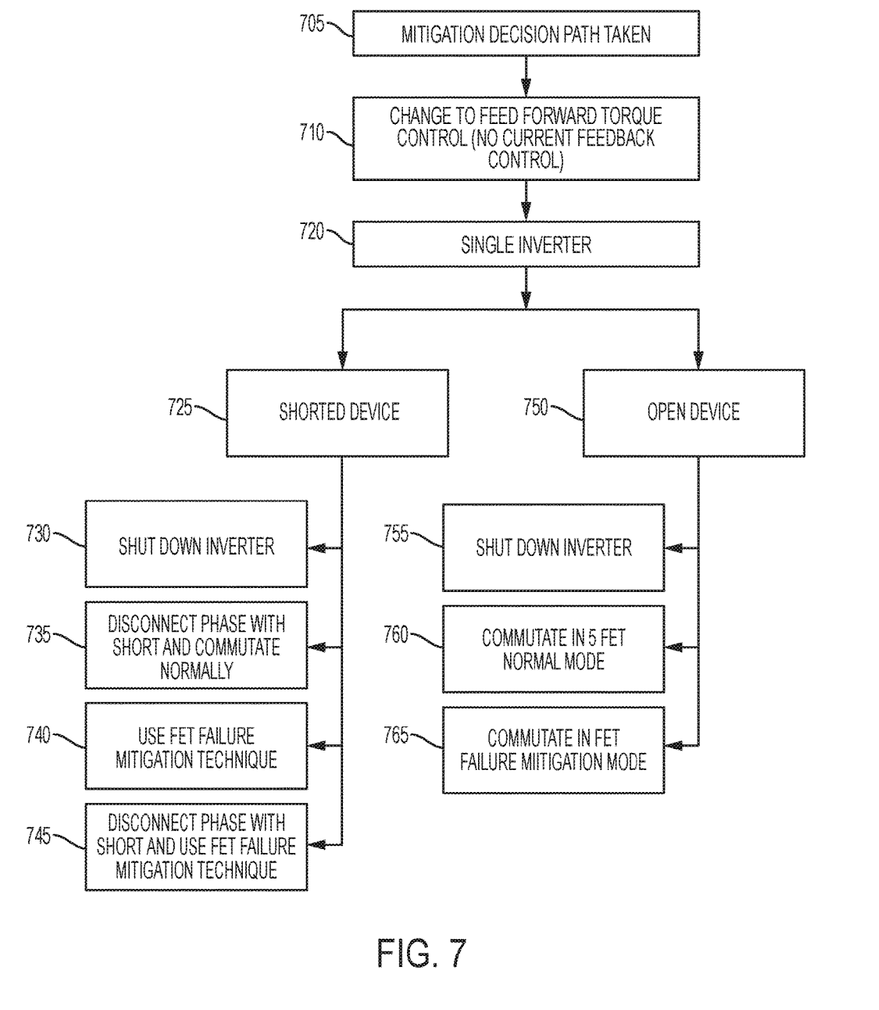
FIG. 7 illustrates a set of mitigation techniques for mitigating effects of a resistance error in case of a single inverter configuration of a motor according to one or more embodiments.
Figure 8:
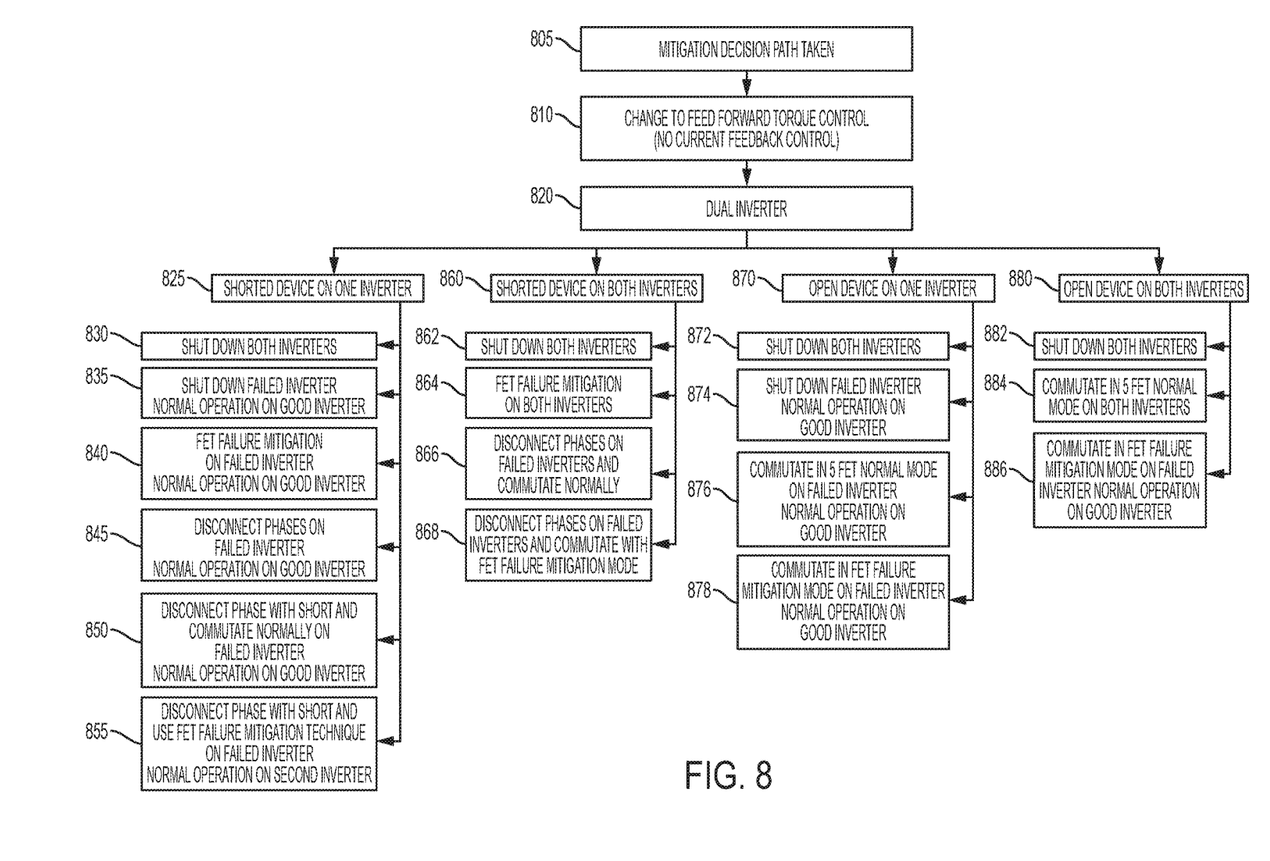
FIG. 8 illustrates a set of mitigation techniques for mitigating effects of a resistance error in case of in a multiple inverter configuration of a motor according to one or more embodiments.

FIGS. 7 and 8 illustrate various examples of mitigation techniques that the mitigation module 250 can select from in response to the error condition detected in the inverter(s) of the motor 19. For example, based on the results of the short test and the open test, the mitigation module 250 performs one or more mitigation methods to commute the current, as shown at 460 (FIG. 4). Particularly, FIG. 7 illustrates a set of mitigation techniques for mitigating the effects in case of a single inverter configuration, while FIG. 8 illustrates a set of mitigation techniques in a multiple inverter method. Although FIG. 8 illustrates the scenario for a dual-inverter, it is understood that similar mitigating techniques may be used in case of additional inverters. Further, it is noted that the methods described herein use 3-phase inverters, however the methods are similarly applicable to inverters with a different number of phases.

Referring to FIG. 7, in case of the single inverter configuration, in one or more embodiments, in response to taking the mitigation step (460 in FIG. 4), the motor control module 260 changes the inverter 200 that is in error condition to feed forward torque mode from current feedback control mode, as shown at 705 and 710. In one or more examples, the mitigation technique is selected based on which specific transistor(s) from the pair have an error. In case the error detected is a weak-short, the motor control module 260 may shut down the inverter 200, as shown at 725 and 730. Alternatively, the motor control module 260 may select to disconnect the phase (that is, the transistor pair) that has the weak-short condition and further continues to commutate using the remaining phases in torque-boost mode, as shown at 735. In one or more embodiments, the phase may be disconnected by opening a relay associated with the phase or transistor device, not shown in figures. In one or more embodiments, in the torque-boost mode, the motor control module 260 boosts the driver torque using a modified torque command by altering the base voltage command itself that is used for the torque assist command Alternatively, the mitigation module 250 selects a FET failure mitigation mode. When the motor phase coil is shorted to one of the power source terminals, which means that the shorted phase voltage is either battery voltage or ground. In this event, in the FET failure mitigation mode, the motor control system 42 shifts a phase coil terminal voltage reference so that a voltage applied at the shorted (faulted) phase coil terminal is equal to a voltage that would be obtained on the faulted phase coil terminal under a shorted condition. Further, the FETs are switched so that the average voltage across the three phase coils is equal to modified voltages. It should be noted that although the foregoing steps provide a driver assist torque during a fault condition, there are also certain motor positions where a phase coil terminal voltage is clamped to a maximum value or a minimum value and thus a desired voltage cannot be applied to the motor 19 to obtain a desired torque response. The motor control system 42, however, can modify a voltage phase angle so that an applied voltage to a phase coil at these certain motor positions is such that after changing the reference voltage, the amplitude of the phase coil voltage is within the clamped voltage range.

Thus, the motor control system 42 facilitates generating the torque assist command by the motor 19 using the phase that is in the weak-short error condition using the FET mitigation mode, as shown at 740. Alternatively, in one or more embodiments, the mitigation module 250 disconnects the phase that is in error condition, and subsequently executes the FET failure mitigation by commutating the motor 19 using the remaining phases (that is without the phase that is in error condition), as shown at 745.

Alternatively, in case the error detected is an open condition, the mitigation module 250 shuts down the inverter 200, as shown at 750 and 755. Alternatively, the mitigation module commutates the inverter 200 in 5-FET mode, as shown at 760. It is noted that the 5-FET mode is specific to the 3-phase-6-pole inverter 200 example illustrated in FIG. 2. In case the inverter 200 has a different number of poles, say P, the motor control module 260 commutates the inverter 200 using P-1 FET mode. The motor control module 260 commutates in a FET failure mitigation mode, as shown at 765. In one or more examples, the mitigation module 250 commutates the inverter 200 in failure mitigation mode, as shown at 765. As described earlier, in one or more examples, the failure mitigation mode facilitates the steering system 12 to boost the driver assist torque command Alternatively, in the failure mitigation mode, the steering system 12 operates with only the remaining components, without using an additional boost for the driver assist torque command.

Referring now to FIG. 8, in case of the dual-inverter configuration, the motor control module 260 initially switches the inverter 200 into the feed-forward torque mode, as shown at 805 and 810. The method further includes determining the error condition from the four possibilities in this case—weak-short in the first inverter 200; open-condition in the first inverter 200, weak-short in both; the first inverter 200 and the second inverter 300; and an open condition in both, the first inverter 200 and the second inverter 300. Accordingly, in response to the error condition being the weak-short only in the first inverter 200, the mitigation module 250 shuts down both, the first inverter 200 and the second inverter 300, as shown at 825 and 830.

Alternatively, the mitigation module 250 maintains the failed inverter 200 in shut down mode and initializes the second inverter 300 to commutate, as shown at 835. In yet another example, the mitigation module 250 uses the inverter 200 in the FET failure mitigation mode and the inverter 300 in regular operation mode, as shown at 840. The FET failure mitigation mode is described herein.

Alternatively, in another example, the mitigation module 260 disconnects all of the phases in the failed inverter 200 and operates the second inverter 300 in regular operation mode, as shown at 845. In regular operation mode, a standard predetermined commutation is used to generate the torque command from the motor 19 using predetermined reference voltages at each phase coil.

In another example, the mitigation module 250 disconnects only those phases of the inverter 200, which have an error condition, and thus only keeps the phase without an error condition connected, as shown at 850. The phase may be disconnected using one or more relays, fuses, or any other such components. The mitigation module 250 subsequently continues to operate the failed inverter 200 in regular operation mode with only the connected phases, along with the second inverter 300 in regular operation mode. In yet another example, the mitigation module 250, after disconnecting the failed phases, executes the inverter 200 in the FET failure mitigation mode and the second inverter 300 continues in the regular operation mode, as shown at 855.

In case both inverters, the inverter 200 and the inverter 300, have a weak-short, in an example, the mitigation module 250 shuts down both the inverters, as shown at 860 and 862. Alternatively, the mitigation module 250 executes both the inverters in FET failure mitigation mode (without disconnecting any phase), as shown at 864. In yet another example, the mitigation module 250 disconnects the failed phases on both inverters and uses regular operation mode on both inverters, as shown at 866. In yet another example, the mitigation module disconnects the failed phases in both inverters and commutates the current in both inverters in FET failure mitigation mode, as shown at 868.

In case one of the inverters has an open condition, and the other inverter is error-free, the mitigation module 250 selects a mitigation technique as described herein, as shown at 870. For example, consider that the inverter 200 has the open condition, and the second inverter 300 is operating without an error. In one example, the mitigation module 250 shuts down both the inverters, as shown at 872. Alternatively, the mitigation module shuts down only the inverter 200 and continues to operate the second inverter 300 to commutate and thus, generate the torque command, as shown at 874. Alternatively, the mitigation module 250 uses the inverter 200 in 5-FET mode, by disconnecting the transistor that is in open condition, and using the second inverter 300 in regular operation mode, as shown at 876. As described earlier, the '5-FET' mode is specific to the 3-phase-6-pole example of FIG. 2, and in general P-1 phases are used. Alternatively, the mitigation module 250 uses the inverter 200 in FET failure mitigation mode and continues to use the second inverter 300 in regular operation mode, as shown at 878.

In another case, both inverters may have at least one device in open condition, as shown at 880. In such a case, the mitigation module 250, in one example, shuts down both the inverters, as shown at 882. Alternatively, the mitigation module 250 facilitates commutation by both inverters in 5-FET mode, as shown at 884. Alternatively yet, the mitigation module 250 operates both inverters in FET failure mitigation mode, as shown at 886.

Thus, the technical solutions described herein facilitate using low side shunt resistors to detect "weaker" transistor and phase shorts in an inverter operating a motor that generates driver assist torque command in power steering systems. For example, detecting current through a low side shunts when lower transistor is enabled facilitates shoot through detection of a high side (or upper) transistor. Further, detecting non-zero values of current when the low side transistor is commanded open facilitates shoot through detection of the low side (or lower) transistor failure. In one or more examples, after a gate drive detects a hard short or open, the current is interrogated by turning on the complementary of the failed transistor and checking the voltage on the corresponding low side shunt. Accordingly, open vs shorted condition is detected. Based on the identified condition, a mitigation module selects a commutation operation mode to optimize the driver assist torque generated by the power steering system.

For example, in a single inverter configuration, the mitigation technique selected in response to a weak-short condition may include one from, shutting down the inverter with the resistance error, operating the inverter in transistor mitigation commutation mode, disconnecting the phase that includes the transistor with the resistance error and operating the inverter in regular-mode, and disconnecting the phase that includes the transistor with the resistance error and operating the inverter in transistor mitigation commutation mode. For example, in a single inverter configuration, the mitigation technique selected in response to an open condition may include one from shutting down the inverter with the resistance error, operating the inverter in transistor mitigation commutation mode, and disconnecting the transistor that has the resistance error and operating the inverter in regular operation mode with the remaining transistors (e.g.: 5 of 6 transistors in FIG. 1).

Further, in the multiple inverter configuration, the mitigation technique may include shutting down all the inverters. Alternatively, in case one of the inverters fails, the mitigation technique may include operating the motor in single inverter configuration with one of the non-failed inverters in feed forward torque control in one of the combinations of single inverter mitigation techniques described above. Alternatively, if all inverters experience a resistance error concurrently, the mitigation technique may include using a combination of the single inverter mitigation techniques described above on each inverter.

The embodiments of the technical solutions described herein improve EPS systems, in which, a PID loop may use current measurements for correcting failures encountered during operation (that is, in operate mode), typically diagnostics are based on voltage measurements across the drain to source of the transistor(s) in the inverter. If a shoot through, high current condition exist then the voltage will be higher across the MOSFET. In case of weaker transistor shorts, such voltage measurements are not high enough to distinguish a short from normal operation. By detecting this condition, the technical solutions described herein facilitate preventing multiple transistors from cascading into additional failures resulting in higher braking torque. In other words if one shorted transistor is encountered, the condition is detected before a complimentary transistor thermally fails. Further, the technical solutions facilitate preventing an induction error with a winding set on systems with dual windings, which is alleviated in EPS systems with a transition to feed forward torque control.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession, in fact, may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

While the technical solutions are described in detail in connection with only a limited number of embodiments, it should be readily understood that the technical solutions are not limited to such disclosed embodiments. Rather, the technical solutions can be modified to incorporate any number of variations, alterations, substitutions, or equivalent arrangements not heretofore described, but which are commensurate with the spirit and scope of the technical solutions. Additionally, while various embodiments of the technical solutions have been described, it is to be understood that aspects of the technical solutions may include only some of the described embodiments. Accordingly, the technical solutions are not to be seen as limited by the foregoing description.

What is claimed is:

1. A motor control system for detecting an error in an inverter associated with a motor and operating a system in response to the error, the motor control system comprising:
   a transistor pair operative to selectively provide power to a corresponding phase coil of the motor of the system, wherein the transistor pair comprises:
      a high-side transistor and a low-side transistor connected in series, wherein the high-side transistor is connected to a power supply, and the low-side transistor is connected to a shunt resistor, which is associated with the transistor pair;
   a detection module that detects a resistance error in the transistor pair by monitoring a voltage across the shunt resistor in response to a gate drive command applied to the transistor pair;
   a mitigation module that selects a mode of operation of the inverter based on the resistance error; and
   a motor control module that controls the inverter according to the mode of operation.

2. The motor control system of claim 1, wherein the resistance error is a short condition of a transistor in the transistor pair.

3. The motor control system of claim 2, wherein the detection module identifies which transistor from the transistor pair has the weak-short condition.

4. The motor control system of claim 2, wherein in response to the resistance error being the weak-short condition, the mitigation module selects shutting down the inverter.

5. The motor control system of claim 2, wherein in response to the resistance error being the weak-short condition, the mitigation module selects a transistor mitigation commutation mode as the mode of operation of the inverter.

6. The motor control system of claim 2, wherein in response to the resistance error being the weak-short condition, the mitigation module selects to disconnect the corresponding phase coil associated with the transistor pair that includes the transistor that has the resistance error.

7. The motor control system of claim 6, wherein in response to the resistance error being the weak-short condition, the mitigation module further selects a transistor mitigation commutation mode as the mode of operation of the inverter after disconnecting the corresponding phase coil associated with the transistor pair that includes the transistor that has the resistance error.

8. The motor control system of claim 1, wherein the resistance error is an open condition of a transistor in the transistor pair.

9. The motor control system of claim 8, wherein the detection module identifies which transistor from the transistor pair has the open condition.

10. The motor control system of claim 9, wherein in response to the resistance error being the open condition, the mitigation module selects shutting down the inverter.

11. The motor control system of claim 9, wherein in response to the resistance error being the open condition, the mitigation module selects a transistor mitigation commutation mode as the mode of operation of the inverter.

12. The motor control system of claim 9, wherein in response to the resistance error being the open condition, the mitigation module selects to disconnect the transistor that has the resistance error.

13. The motor control system of claim 1, wherein the inverter is a first inverter, and the motor control system comprises a second inverter associated with the motor, and wherein the mitigation module, in response to the resistance error detected in the first inverter, selects the mode of operation of the first inverter and the second inverter.

14. A system for operating a multi-inverter configuration that commutates a motor in a power steering system, the system comprising:
  a detection module configured to detect a resistance error in a transistor pair that switches power provided to a corresponding phase coil of a motor of the power steering system, wherein the detection module detects the resistance error by monitoring a voltage across a shunt resistor associated with the transistor pair;
  a mitigation module that selects a mode of operation of each respective one or more inverters in the multi-inverter configuration in response to the resistance error being detected, and based on a type of the resistance error detected; and
  a motor control module that controls the one or more inverters according to the each mode of operation respectively selected.

15. The system of claim 14, wherein the transistor pair comprises:
  a high-side transistor and a low-side transistor connected in series, wherein the high-side transistor is connected to a power supply, and the low-side transistor is connected to the shunt resistor, which is associated with the transistor pair.

16. The system of claim 15, wherein, in response to the resistance error being an open condition in the transistor pair, which is in a first inverter from the multi-inverter configuration, the detection module identifies which transistor from the transistor pair has the open condition, and in response to identifying an open-condition-transistor, the mitigation module selects to continue commutating the motor using the first inverter after disconnecting the open-condition-transistor from the transistor pair.

17. The system of claim 14, wherein, in response to the resistance error being a short condition in the transistor pair, which is in a first inverter from the multi-inverter configuration, the mitigation module selects to shut down the first inverter, and continue commutating the motor using a second inverter from the multi-inverter configuration.

18. The system of claim 14, wherein, in response to the resistance error being an open condition in the transistor pair, which is in a first inverter from the multi-inverter configuration, the mitigation module selects to shut down the first inverter, and continue commutating the motor using a second inverter from the multi-inverter configuration.

19. A method of commutating a motor in a power steering system using one or more inverters, the method comprising:
  detecting, by a detection module, a resistance error in a transistor pair that switches power provided to a corresponding phase coil of a motor of the power steering system, wherein the detection module detects the resistance error by monitoring a voltage across a shunt resistor associated with the transistor pair;
  selecting, by a mitigation module, a mode of operation of each respective inverter from the one or more inverters in response to the resistance error being detected, and based on a type of the resistance error detected; and
  controlling, by a motor control module, each inverter from the one or more inverters according to the respective mode of operation selected.

20. The method of claim 19, wherein the transistor pair comprises a high-side transistor and a low-side transistor connected in series, wherein the high-side transistor is connected to a power supply, and the low-side transistor is connected to the shunt resistor, which is associated with the transistor pair, and the method further comprises:
  identifying, by the detection module, which transistor from the transistor pair has the resistance error.

* * * * *